US012487253B2

(12) United States Patent
Maggioni

(10) Patent No.: US 12,487,253 B2
(45) Date of Patent: *Dec. 2, 2025

(54) LARGE PROBE HEAD FOR TESTING ELECTRONIC DEVICES AND RELATED MANUFACTURING METHOD

(71) Applicant: TECHNOPROBE S.P.A., Cernusco Lombardone (IT)

(72) Inventor: Flavio Maggioni, Cernusco Lombardone (IT)

(73) Assignee: TECHNOPROBE S.P.A., Cernusco Lombardone (IT)

( * ) Notice: Subject to any disclaimer, the term of this patent is extended or adjusted under 35 U.S.C. 154(b) by 147 days.

This patent is subject to a terminal disclaimer.

(21) Appl. No.: 18/253,442

(22) PCT Filed: Nov. 26, 2021

(86) PCT No.: PCT/EP2021/083116
§ 371 (c)(1),
(2) Date: May 18, 2023

(87) PCT Pub. No.: WO2022/112480
PCT Pub. Date: Jun. 2, 2022

(65) Prior Publication Data
US 2023/0417798 A1 Dec. 28, 2023

(30) Foreign Application Priority Data

Nov. 27, 2020 (IT) .................. 102020000028841

(51) Int. Cl.
*G01R 1/073* (2006.01)
*G01R 3/00* (2006.01)
(52) U.S. Cl.
CPC ........... *G01R 1/07342* (2013.01); *G01R 3/00* (2013.01)

(58) Field of Classification Search
CPC ............ G01R 1/07342; G01R 1/07357; G01R 1/07378; G01R 1/44; G01R 3/00
See application file for complete search history.

(56) References Cited

U.S. PATENT DOCUMENTS

| 2006/0046528 A1 | 3/2006 | Beaman et al. |
| 2008/0150568 A1 | 6/2008 | Weiland et al. |

(Continued)

FOREIGN PATENT DOCUMENTS

| CN | 101385137 A | 3/2009 |
| TW | 201821809 A | 6/2018 |

OTHER PUBLICATIONS

International Search Report and Written Opinion for Corresponding International Application No. PCT/EP2021/083116 (11 Pages) (Feb. 28, 2022).

*Primary Examiner* — Judy Nguyen
*Assistant Examiner* — Brent J Andrews
(74) *Attorney, Agent, or Firm* — LUCAS & MERCANTI, LLP

(57) ABSTRACT

A method for manufacturing a probe head for the functionality testing of devices under test (DUT) is disclosed. The method includes providing a containment element, arranging a lower guide at a lower face of the containment element which faces toward the devices under test during the test, and arranging an upper guide at an upper face of the containment element. The containment element is interposed between the lower and upper guides which are initially in the shape of a single plate connected to the containment element. The method further includes cutting the lower and/or upper guide thereby defining a plurality of guide portions that are independent and separated from each other, and inserting a plurality of contact elements into respective guide holes formed in the guides. The contact (Continued)

elements are adapted to contact pads of the devices under test. A probe head obtained by the method is also disclosed.

16 Claims, 6 Drawing Sheets

(56) References Cited

U.S. PATENT DOCUMENTS

| | | |
|---|---|---|
| 2009/0184727 A1 | 7/2009 | Kim et al. |
| 2012/0264320 A1* | 10/2012 | Parrish ............... G01R 1/07378 439/249 |
| 2019/0113539 A1* | 4/2019 | Crippa ............... G01R 1/07357 |
| 2020/0057095 A1 | 2/2020 | Liberini |
| 2020/0292580 A1 | 9/2020 | Wei et al. |
| 2021/0102975 A1* | 4/2021 | Ahn ................... G01R 31/2831 |
| 2024/0012028 A1* | 1/2024 | Maggioni .......... G01R 1/07314 |

\* cited by examiner

LARGE PROBE HEAD FOR TESTING ELECTRONIC DEVICES AND RELATED MANUFACTURING METHOD

CROSS-REFERENCE TO RELATED APPLICATIONS

This application is a 371 of PCT/EP2021/083116, filed Nov. 26, 2021, which claims the benefit of Italian Patent Application No. 102020000028841, filed Nov. 27, 2020.

FIELD OF APPLICATION

The present disclosure relates to a probe head, and to a related manufacturing method, for testing electronic devices integrated on a semiconductor wafer, in particular a large probe head for testing memory devices (such as for instance DRAMs), and the following description is made with reference to this application field with the only purpose of simplifying the exposition thereof.

BACKGROUND OF THE INVENTION

As it is well known, a probe head is essentially an electronic device adapted to electrically connect a plurality of contact pads of a microstructure, in particular an electronic device integrated on a semiconductor wafer, with corresponding channels of a testing apparatus that performs the functionality testing thereof.

This test is useful for detecting and isolating defective circuits as early as in the production phase. Normally, the probe heads are therefore used for the test of the circuits integrated on wafers before cutting and assembling them inside a containment package.

Generally, a probe head comprises a plurality of contact probes held by at least one guide or by at least one pair of guides (or supports) which are substantially plate-shaped and parallel to each other. Said guides are equipped with suitable guide holes and are arranged at a certain distance from each other in order to leave a free space or air gap for the movement and possible deformation of the contact probes, which are slidingly housed in said guide holes. In particular, the pair of guides comprises an upper guide and a lower guide, both provided with respective guide holes within which the contact probes axially slide, said probes being usually made of special alloys with good electric and mechanical properties.

The good connection between the contact probes and the contact pads of the device under test is ensured by the pressure of the probe head on the device itself, wherein, during said pressing contact, the contact probes undergo a bending inside the air gap between the two guides and a sliding inside the relative guide holes. Probe heads of this type are commonly referred to as "vertical probe heads".

Substantially, the vertical probe heads have an air gap where a bending of the contact probes occurs, wherein said bending may be facilitated through a suitable configuration of the probes themselves or of the guides thereof.

By way of example, FIG. 1 schematically shows a probe card of the known type, globally indicated with reference number 15 and including a probe head 1 comprising in turn at least one upper plate-shaped support or guide 2, usually indicated as "upper die", and a lower plate-shaped support or guide 3, usually indicated as "lower die", having respective guide holes 4 and 5 within which a plurality of contact probes 6 slide.

Each contact probe 6 has at an end a contact tip 7 apt to abut onto a contact pad 8 of a device under test that is integrated on a wafer 9, thus performing the mechanical and electric contact between said device under test and a testing apparatus (not represented) which said probe card 15 is an end element of.

As indicated in FIG. 1, the upper guide 2 and the lower guide 3 are suitably spaced apart by an air gap 10 which allows the contact probes 6 to deform. Generally, the probe head 1 comprises also a containment element or housing (not shown in FIG. 1), which is arranged between the upper guide 2 and the lower guide 3 in order to provide support to said guides.

The probe head 1 is a vertical probe head in which, as previously seen, the good connection between the contact probes 6 and the contact pads 8 of the device under test is ensured by the pressure of the probe head on the device itself, wherein the contact probes 6, which are movable within the guide holes 4 and 5 formed in the guides 2 and 3, undergo a bending inside the air gap 10 and a sliding inside said guide holes during said pressing contact.

In some cases, the contact probes are fixedly fastened to the probe head itself at the upper plate-shaped support: such probe heads are referred to as "blocked probe heads".

However, more frequently, probe heads with non-blocked probes (i.e. not fixedly fastened) are used, the probes being held interfaced to a so-called board, possibly through a microcontact board: such probe heads are referred to as "unblocked probe heads". The microcontact board is usually called "space transformer" since, besides contacting the probes, it also allows spatially redistributing the contact pads made thereon with respect to the contact pads on the device under test, in particular relaxing the distance constraints between the centers (pitches) of the pads themselves.

In this case, still with reference to FIG. 1, each contact probe 6 has a further end area or region ending with a so-called contact head 11 towards a contact pad 12 of a plurality of contact pads of a space transformer 13 of the probe card 15 which comprises the probe head 1. The good electric connection between contact probes 6 and space transformer 13 is ensured by means of the pressing contact of the contact heads 11 of the contact probes 6 onto the contact pads 12 of said space transformer 13 analogously to the contact between the contact tips 7 and the contact pads 8 of the device under test integrated on the wafer 9.

Furthermore, the probe card 15 comprises a support plate 14, generally a printed circuit board (PCB), connected to the space transformer 13, through which the probe card 15 interfaces with the testing apparatus (not shown).

The proper operation of a probe head is basically linked to two parameters: the vertical movement, or overtravel, of the contact probes, and the horizontal movement, or scrub, of the contact tips of said contact probes onto the contact pads.

All these features should be evaluated and calibrated in the manufacturing step, since the proper electric connection between the contact probes and the device under test should always be ensured.

Furthermore, according to the known solutions, the support plate 14 is kept in position through a stiffener 16.

Generally, the space transformer 13 has very reduced thicknesses and thus it has significant problems of planarity (flatness). For this reason, it is also generally associated with a stiffener (not shown in FIG. 1), which is configured to make the whole assembly more rigid and resistant and allows reducing planarity defects, which often affect the proper operation of the probe cards made according to the aforementioned technology.

Generally, the testing methodologies require the probe head to be able to withstand extreme temperatures, as well as to work correctly at different temperatures (both very high and very low temperatures). However, in this case, the thermal expansions of the components of the probe head may affect its correct behavior. In fact, the components of the probe heads of the known type (such as the guides and the housing) are usually fastened to each other and have different thermal expansion coefficients, as well as they are subjected to different temperatures. During the test (for example at high or low temperatures), due to the different thermal expansion coefficients of the materials which said components are made of and due to the constraints there between, the components themselves tend to arch and bend, causing malfunctions of the probe head as a whole, even causing an absence of contact with the contact pads of the device under test.

This problem is particularly important in case of large probe heads, such as for instance the probe heads for testing memory devices such as DRAMs. For this kind of probe heads, in fact, failure to control the thermal expansion of the components entails considerable problems in the testing phase.

It is therefore an aim of the present invention to provide a probe head for testing electronic devices having functional and structural features such as to overcome the limitations and drawbacks still affecting the known solutions, in particular a large probe head which allows ensuring the correct execution of the tests even at extreme temperatures and to withstand considerable temperature variations, being at the same time easy to assemble.

SUMMARY OF THE INVENTION

According to the present invention it is proposed to manufacture a probe head by a method according to which the guides are initially fastened to the housing in the form of a single plate (for example a single plate of ceramic material) and subsequently cut into a plurality of guide modules or guide portions which are independent and separated from each other. In this way, the guides are associated with the probe head as a single material block, without having to carry out an alignment of the single guide portions, which then allow an improved control of the thermal expansion of the probe head during the test.

An exemplary manufacturing method of a probe head for the functionality testing of devices under test, according to the present invention comprises the steps of providing a containment element or housing, arranging a lower guide at a lower face of the containment element, said lower face facing towards the devices under test during the test, and arranging an upper guide at an upper face of the containment element, said upper face being opposite the lower face, wherein the containment element is interposed between the lower guide and the upper guide, and wherein the guides are initially in the shape of at least one single plate when they are connected to the containment element, the method further comprising the steps of cutting at least one guide among the lower guide and the upper guide, thereby defining a plurality of guide portions which are independent and separated from each other, starting from said at least one single plate, and inserting a plurality of contact elements (or at least portions thereof) into respective guide holes formed in the guides, said contact elements being adapted to contact pads of the devices under test.

In this way, it is initially provided at least one single plate, i.e., a single structural element in which there are no elements separated from each other, said single structural element being cut only after the connection with the housing.

More particularly, the invention comprises the following additional and optional features, taken singularly or in combination if needed.

According to an aspect of the present invention, both the lower guide and the upper guide can be divided into the plurality of guide portions.

According to an aspect of the present invention, the cutting of the single plate of the guides can be performed by laser cutting or water cutting.

According to an aspect of the present invention, the method can comprise the preliminary step of gluing the lower guide and the upper guide to the containment element prior to the cutting said guides.

According to an aspect of the present invention, the method can further comprise the step of forming, prior to cutting single plates of the guides, the guide holes for housing the contact probes. Alternatively, the guide holes can be formed after cutting the single plates of the guides.

According to an aspect of the present invention, the method can comprise the step of forming, in the containment element, a plurality of housing seats separated by internal arms, defining a mesh structure adapted to support the guides, the contact elements being housed (at least partially) in said housing seats.

According to an aspect of the present invention, the single plate of the guides can be made of a ceramic material.

According to an aspect of the present invention, the method can comprise the step of selecting the material of the containment element among Invar, Kovar, Alloy 42 or FeNi alloys, Titanium or alloys thereof, Aluminium or alloys thereof, Steel, Brass, Macor.

According to an aspect of the present invention, the method can comprise the step of associating the probe head with a probe card comprising a stiffener, an interposer, and an interface board.

According to an aspect of the present invention, the probe card can be manufactured by the steps of connecting the interposer to the stiffener (said interposer being initially in the shape of at least one monobloc of material), and cutting the at least one monobloc of the interposer according to a predetermined pattern after connecting it to the stiffener, thereby defining a plurality of modules separated from each other.

The present invention also refers to a probe head for the functionality testing of devices under test, comprising a containment element or housing, a lower guide arranged at a lower face of the containment element, said lower guide facing towards the devices under test during the test, an upper guide arranged at an upper face of the containment element, said upper face being opposite the lower face, and a plurality of contact elements housed in guide holes in the guides, said contact elements being adapted to contact pads of the devices under test, wherein the containment element is interposed between the lower guide and the upper guide, and wherein at least one of the guides is divided into a plurality of guide portions that are independent and separated from each other, said guide portions being obtained by cutting at least one single plate that is initially connected to the containment element.

According to an aspect of the present invention, the contact elements can be vertical contact probes comprising a body which extends along a longitudinal axis between a first end and a second and opposite end, said first end being adapted to contact the pads of the devices under test.

According to an aspect of the present invention, the guides can comprise a number of guide portions ranging from 4 to 100, or even more.

According to an aspect of the present invention, the containment element can be made of at least one of Invar, Kovar, Alloy 42 or FeNi alloys, Titanium or alloys thereof, Aluminium or alloys thereof, Steel, Brass, Macor.

According to an aspect of the present invention, the guides can be made of a ceramic material.

According to an aspect of the present invention, the containment element can comprise a plurality of housing seats defined by internal arms, which are configured to support the guide portions.

The present invention also refers to a probe card for the functionality testing of devices under test, comprising a stiffener, an interface board associated with the stiffener and configured for interfacing the probe card to a testing apparatus, and a probe head as illustrated above.

According to an aspect of the present invention, the interposer can comprise a plurality of modules that are independent and separated from each other, wherein said modules of the interposer are obtained by cutting at least one monobloc of material that is initially connected to the stiffener.

The characteristics and advantages of the method and of the probe head according to the invention will be apparent from the description, made hereinafter, of an embodiment thereof, given by way of indicative and non-limiting example, with reference to the enclosed drawings.

DETAILED DESCRIPTION

Figure 1:
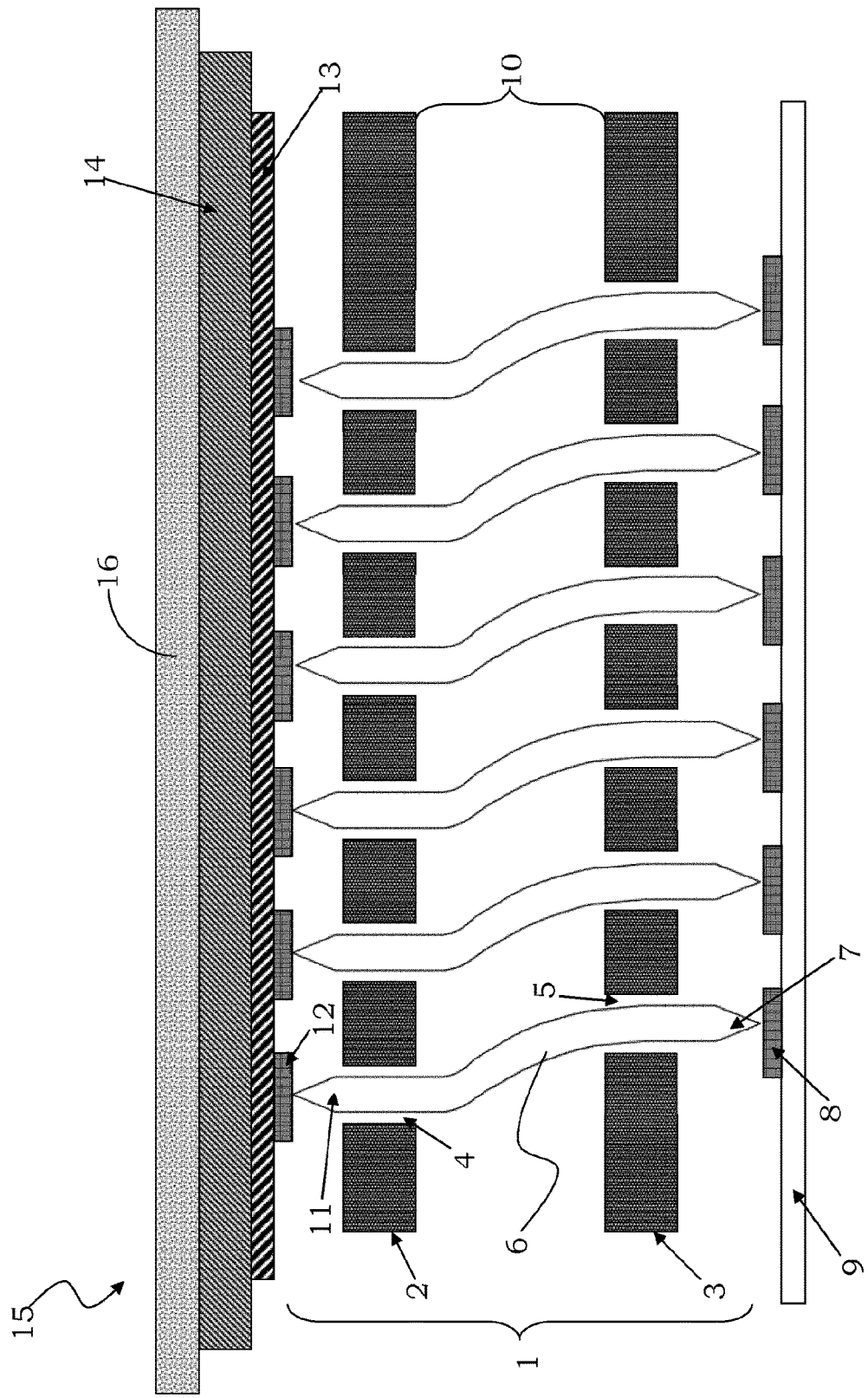
FIG. 1 schematically shows a probe card including a probe head according to the prior art.
Figure 2:
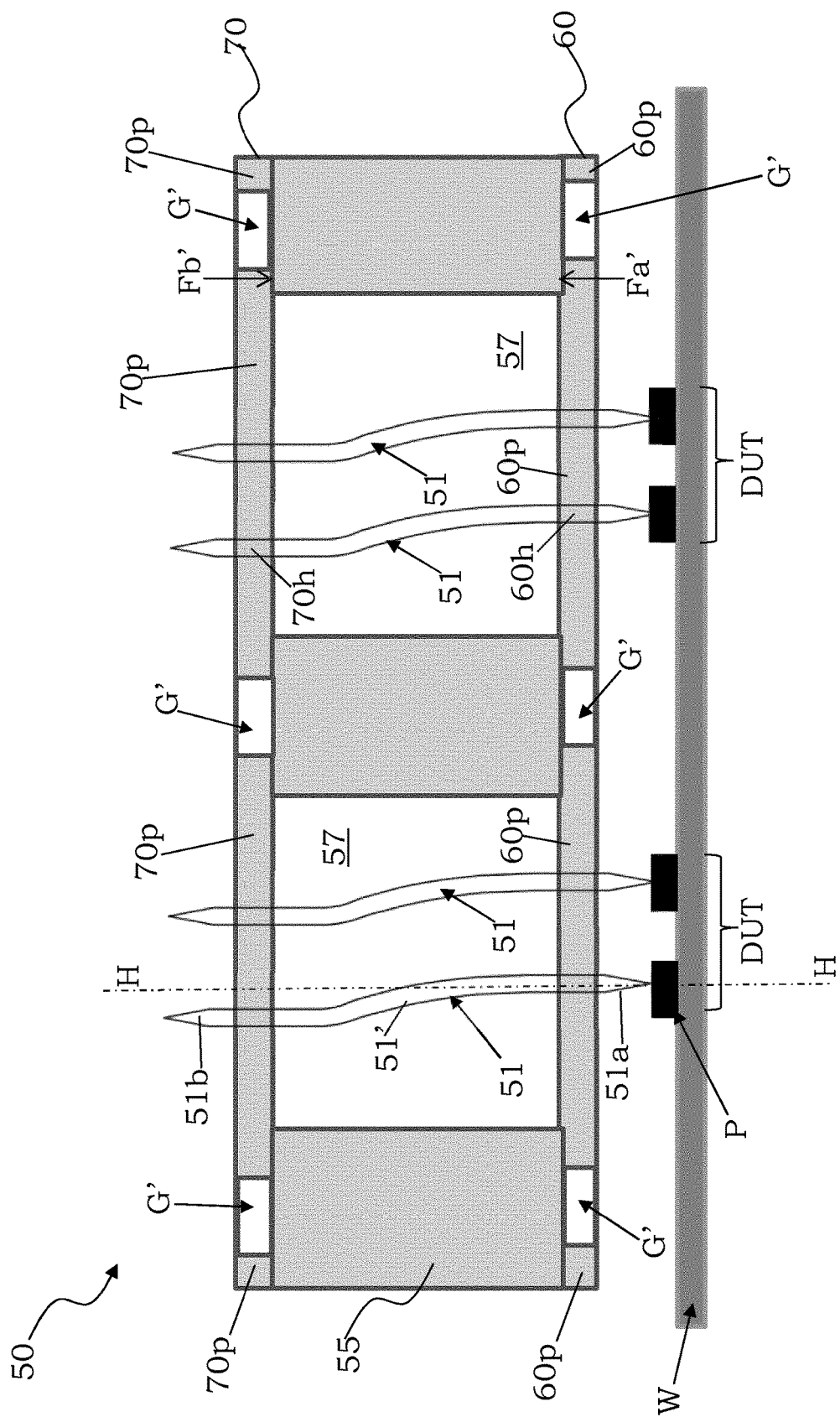
FIG. 2 schematically shows a probe head according to the present invention.

With reference to those figures, and in particular to FIG. 2, a probe head for testing electronic devices that are integrated on a semiconductor wafer according to the present invention is globally and schematically indicated with the reference number 50.

It is worth noting that the figures represent schematic views and are not drawn to scale, but instead they are drawn so as to emphasize the important features of the invention. Moreover, in the figures, the different elements are depicted in a schematic manner, and their shape may vary depending on the application desired. It is also noted that, in the figures, the same reference numbers refer to elements that are identical in shape or function. Finally, particular features described in relation to an embodiment illustrated in a figure are also applicable to the other embodiments illustrated in the other figures.

It is also noted that, unless it is expressly indicated, the method steps may also be reversed if necessary.

As it will be illustrated hereinafter, the probe head 50 of the present invention is particularly suitable for testing memory devices, such as for instance DRAMs, thanks to the large size thereof. In fact it is immediately observed that, as a whole, the area under test may also reach 300 mm (in this case the probe cards are referred to as 12-inch size probe cards), so that, as a whole, the probe head 50 of the present invention may also reach dimensions of 520 mm. For instance, in embodiments in which the probe head 50, as a whole, has a circular shape (and thus it comprises circular-shaped guides), its maximum diameter may be of about 520 mm.

Obviously, the above illustrated application is merely indicative and the probe head 50 of the present invention may be used for testing many other electronic devices. For instance, another one of the many applications is in the automotive field.

Referring to FIG. 2, the probe head 50 comprises a plurality of contact elements 51 (for example contact probes) adapted to electrically connect contact pads P of the devices under test (indicated herein with the reference "DUT") integrated in the semiconductor wafer W with components of the probe head, as illustrated in the following.

More in particular, the contact elements 51 are vertical contact probes comprising a body 51' which extends along a longitudinal axis H-H between a first end 51a and a second and opposite end 51b, said first end 51a being adapted to contact the contact pads P of the devices under test DUT.

The probe head 50 further comprises a containment element or housing 55 configured to house (at least partially) the contact elements 51 and configured to provide a general support structure for the probe head 50.

The containment element 55 is preferably made of a material selected among suitable FeNi alloys (for example Invar, Kovar, Alloy 42 and other alloys), Titanium or alloys thereof, Aluminium or alloys thereof, steel, brass, Macor, without being anyway limited to these materials. Generally, the thermal expansion coefficient (CTE) is selected so as to compensate the thermal expansions of the silicon wafer W during the test, taking into account the temperature gradients which develop inside the probe head. In general, the CTE of the silicon wafer W is lower than 2 ppm/° C. ($10^{-6}$/° C.) and thus the materials are selected such that, in the probe head 50, the CTE progressively increases when moving away from the wafer W. Indicatively, the optimal CTE of the containment element 55 is comprised between 3 and 6 ppm/° C. ($10^{-6}$/° C.). The materials that can be used for the containment element 55 (like to ones mentioned above) allows the CTE of said containment element 55 to be easily controlled, which is instead more difficult for the guides of the probe head. Even more generally, it is possible to use materials, for example composed materials, with a CTE ranging between 3 and 15 ppm/° C. ($10^{-6}$/° C.).

As mentioned, the probe head 50 comprises a lower guide 60 arranged at a lower face Fa' of the containment element 55 (i.e., during the test, the face facing towards the devices under test DUT) and an upper guide 70 arranged at an opposite upper face Fb' of said containment element 55.

In an embodiment of the present invention, both the lower guide 60 and the upper guide 70 are made of a ceramic material. In general, said guides have a CTE comprised between 1.8 and 5 ppm/° C. ($10^{-6}$/° C.).

The containment element 55 is thus interposed between the lower guide 60 and the upper guide 70 and is adapted to support said guides, providing a rigid support structure for the probe head 50 as a whole.

The probe head 50 is a probe head with vertical probes (i.e., a vertical probe head), wherein the contact elements 51 are movable within lower guide holes 60$h$ and upper guide holes 70$h$ made in the respective guides 60 and 70.

Figure 3:
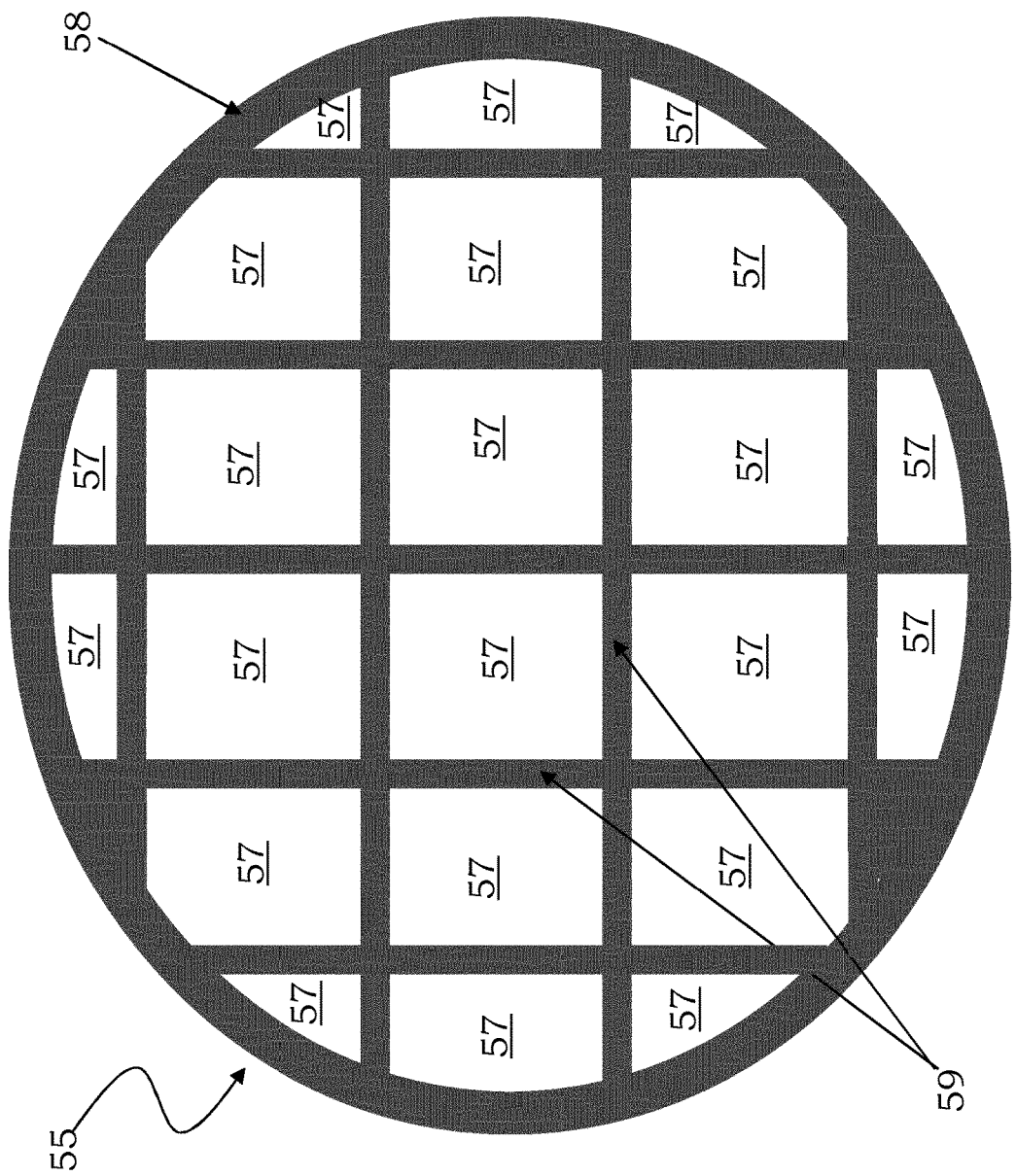
FIG. 3 shows a schematic top view of a containment element of the probe head according to embodiments of the present invention.

With reference to FIG. 3, in an embodiment of the present invention, the containment element 55 is in the form of a block comprising a plurality of housing seats 57 formed therein, the contact elements 51 being housed, preferably in groups, in said housing seats 57. In other words, the containment element 55 does not comprise only a single inner empty space defined by an external perimeter 58 thereof, but it comprises a series of inner partitions (i.e., the above-mentioned housing seats 57) defined by internal arms or walls 59, which provide support for the guides which are then placed thereon. It is substantially a metal mesh structure (metal hive), wherein the arms 59 define said mesh for supporting the guides.

Obviously, the structure depicted in FIG. 3 is only indicative and is not limiting in any way the scope of the present invention. For example, although such figure depicts housing seats 57 which are substantially identical in shape (except the peripheral housing seats), it is also possible to adopt a configuration in which the inner partition of the containment element 55 is less regular. Furthermore, it is not necessary that the housing has a circular shape, and each suitable shape can be then used. For example, the shape can be also polygonal (octagonal, hexadecagonal, etc.) or also square or rectangular. Also the thickness of the internal arms 59 may vary, the drawings being in any way not limiting the scope of the present invention and being provided only by way of non-limitative examples.

The design of the containment element 55 may thus be complex. In an embodiment of the present invention, the containment element 55 is shaped by water cutting or wire electrical discharge machining or, less preferably, chip removal, even if other methods are obviously possible.

Referring again to FIG. 2, advantageously according to the present invention, at least the lower guide 60 (preferably both the guides 60 and 70) comprises a plurality of guide portions 60$p$ which are independent and separated from each other by empty spaces or trenches G', said guide portions 60$p$ being obtained by cutting at least one single plate initially connected to the containment element 55.

In this way, at least one of the guides 60 and 70 is divided into the plurality of guide portions 60$p$ and 70$p$ which are independent and separated from each other, wherein suitable empty spaces G' are defined between them.

In other words, the present disclosure provides to initially connect to the containment element 55 a guide in the form of at least one single plate, i.e., a single structural element in which no elements are present that are separated from each other, said single structural element being cut only after the connection thereof with the housing 55 according to a defined pattern.

As previously mentioned, it is preferable that also the upper guide 70 is partitioned into a plurality of guide portions 70$p$ which are separated from each other by empty spaces G'. These various guide portions (independent and separated from each other) are mechanically supported by the containment element 55 which, as seen above, provides a support structure thanks to the presence of the internal arms 59 which are configured to support said single guide portions 60$p$ and 70$p$. The containment element 55 thus comprises the plurality of housing seats 57 defined by the internal arms 59, which are configured to support said guide portions 60$p$ and 70$p$.

In an embodiment of the present invention, the guides 60 and 70 comprise a number of guide portions 60$p$ and 70$p$ being 4 to 100 or even more, such number being variable according to the needs and/or circumstances and is not limiting the scope of the present invention.

Figure 4:
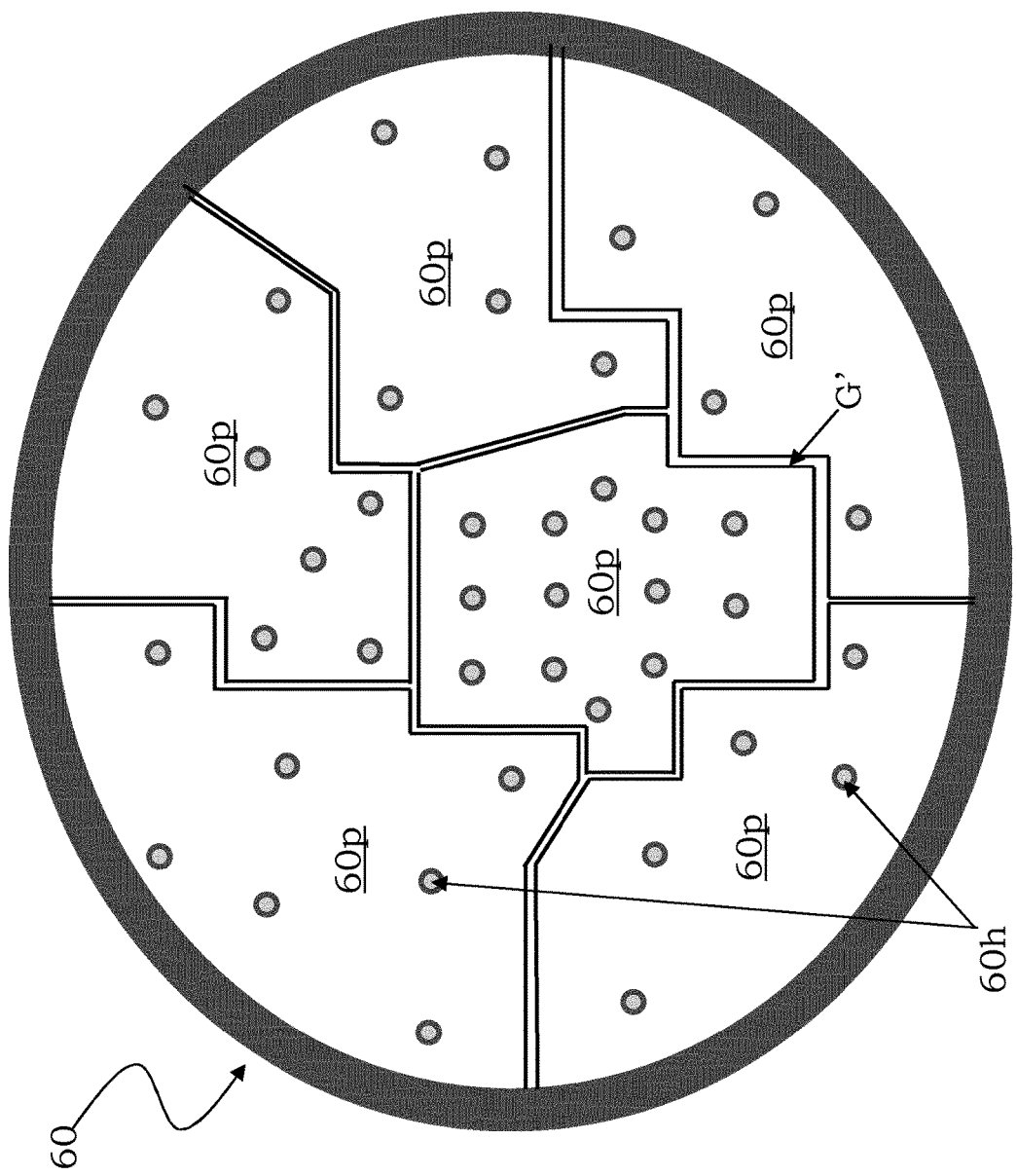
FIG. 4 shows a schematic top view of a guide of the probe head according to embodiments of the present invention.

FIG. 4 is an exemplary and non-limiting top view of the lower guide 60 of the probe head 50, for example of the face facing towards the device under test. In this example, six guide portions 60$p$ are present which are separated from each other by the empty space G', defined for example by laser cutting (even if, as previously mentioned, said guide portions can be higher in number). The guide portions 60$p$ can have different shape (such as in the example of FIG. 4) or can have an identical shape to each other. Furthermore, the guide portions 60$p$ are not limited by a particular shape but can have any suitable shape. For example, the guide portions can also have an irregular profile, which interpenetrates with the one of adjacent guide portions like a puzzle (obviously with the presence of the empty spaces G'). It is in fact possible that the profile of the cutting is very elaborate, in order to respect the correct position of the guide holes and thus of the contact probes (which are substantially bypassed by the cutting) and, from the tester side (thus with reference to the upper guide, not illustrated in this figure) in order to also respect the position of the assembly slots. Also the circular shape of the guide is not limiting the present invention and other suitable forms can be adopted.

The empty space G' is important and separates from each other the independent guide portions, facilitating the control of the thermal shifts of the probe head. Also the pattern of the guide holes 60$h$ can vary from guide portion to guide portion, according to the layout of the device under test (in this example of FIG. 4 there is a density of holes which is higher close to the central portion of the guide).

It can be further observed that it is not necessary that the lower guide 60 and the upper guide 70 have the same number of guide portions, and said guides can have different patterns.

Figure 5:
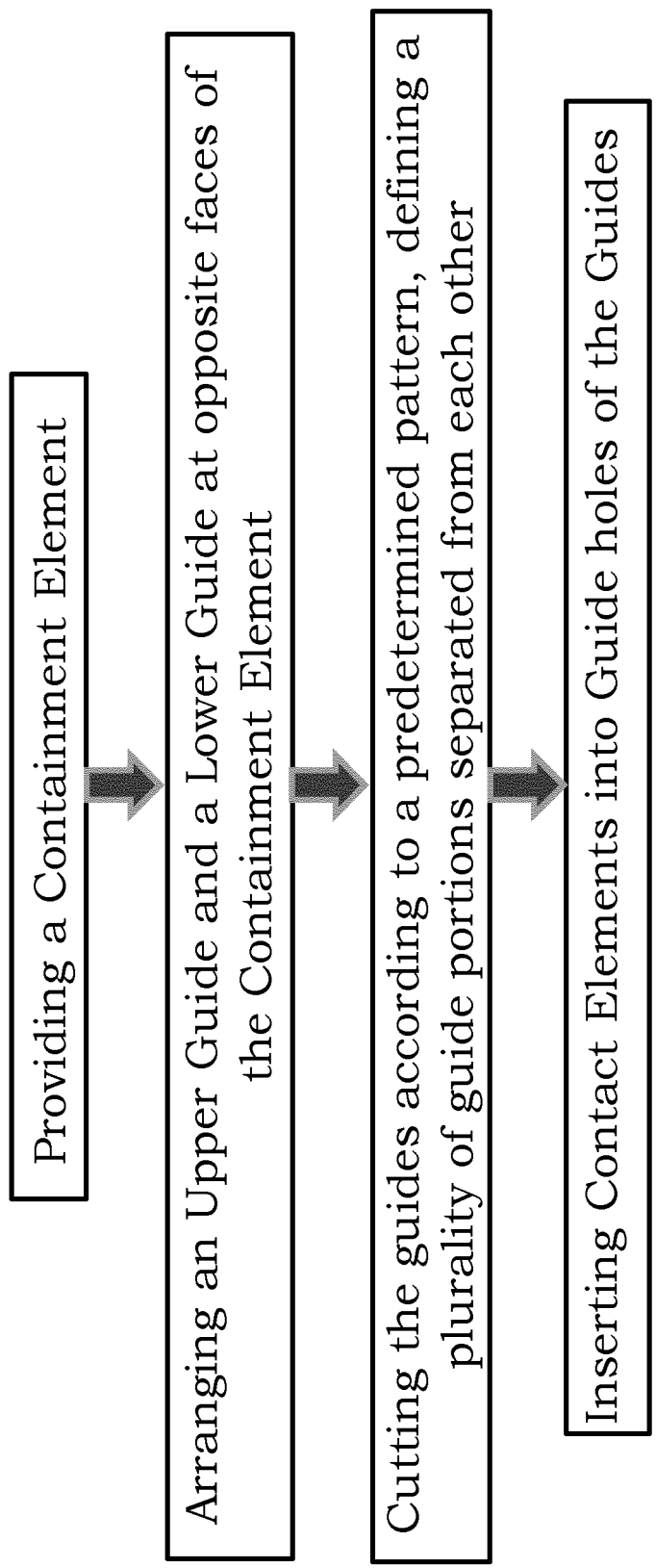
FIG. 5 is a flowchart which illustrates steps of a method of the present invention.

In other words, suitably, as schematized by the flowchart of FIG. 5, the probe head 50 is made by at least the following steps:
   providing the containment element 55 for at least partially housing the contact elements 51;
   arranging the lower guide 60 at the lower face Fa' of the containment element 55;
   arranging the upper guide 70 at the upper face Fb' of the containment element 55, such that the containment element 55 is interposed between the lower guide 60 and the upper guide 70.

Both the guides 60 and 70 are initially in the form of a single plate when they are connected to the containment element 55, such that the method further comprises the step of:
   cutting at least one of the lower guide 60 or the upper guide 70 (preferably both the guides 60 and 70) thereby defining, starting from said at least one single plate, the plurality of guide portions 60$p$ and 70$p$ which are independent and separated from each other.

Obviously, except the sequence which provides first the connection of the guides to the containment element 55 and then the cutting thereof (or at least of one of them), all the other steps are not necessarily following a determined fixed sequence.

The method further provides inserting the contact elements 51 in the guide holes 60*h* and 70*h* formed respectively in the lower guide 60 and in the upper guide 70.

As above illustrated, forming the containment element 55 comprises the step of defining therein the plurality of housing seats 57 separated by the internal arms 59, thus defining the mesh structure for supporting the guides 60 and 70, the contact elements 51 being housed in said housing seats 57.

In an embodiment of the present invention, it is also possible to initially use more than a plate (for example two or three single plates initially connected to the housing, in any case in a limited number), said plates being anyway always subsequently divided into many independent guide portions, and thus initially not comprising any module separated from the others but being a single component to be subsequently divided.

In an embodiment of the present invention, the cutting of the single plate of the guides is carried out by laser cutting. It is also possible to use water cutting, or a combination of these two techniques, even if the laser cutting is considered to be preferred.

In an embodiment of the present invention, prior to the cutting of the guides, a drilling of the plates is carried out (for example by laser cutting) in order to define the guide holes 60*h* and 70*h*, and the contact elements 51 are then inserted in said guide holes after cutting the guides. It is also possible a sequence in which the guide holes are formed after cutting the guides, even if it is preferable to form them prior to the cutting such that they are already aligned to each other.

In an embodiment, the lower guide 60 and the upper guide 70 are preferably glued to the containment element 55 prior to the cutting thereof, even if other suitable connection modes are not excluded. In addition or alternatively, screws can be provided.

Advantageously, the presence of the various guide portions 60*p* and 70*p* separated from each other allows an efficient control of the thermal shifts (thermal expansion of the various components of the probe head) which occur during the tests, in particular during the tests at extreme temperatures. The above-mentioned processing sequence, which provides first the connection of the guides 60 and 70 in the form of a single plate to the containment element 55 and then the cutting said guides into separated modules (guide portions), is particularly advantageous since it eliminates the need to place in the various positions and align the guide portions to each other, which would be extremely complicated and long, with a significant saving in manufacturing times and costs.

In other words, all this considerably simplifies the assembly and setting-up process of the probe head 50, since it is not necessary to align the single guide portions (which would be instead required in case said modules were associated directly to the housing 55 already singulated as in the prior art): after cutting the guides, the single guide portions are already perfectly aligned. The structural independence of the guide portions then guarantees a greater control of the thermal expansion of the components during the test, in particular at extreme temperatures, as will be specified in the following.

Thanks to this configuration, the thermal expansion of the probe head 50 is thus mainly linked to the CTE of the containment element 55, which, as previously disclosed, can be controlled in a simple way (by selecting and calibrating one of the above-mentioned materials) such as to compensate the variations of the wafer W, the separation between the guide portions allowing the latter not to be linked to the changes to which said containment element is subjected.

Figure 6:
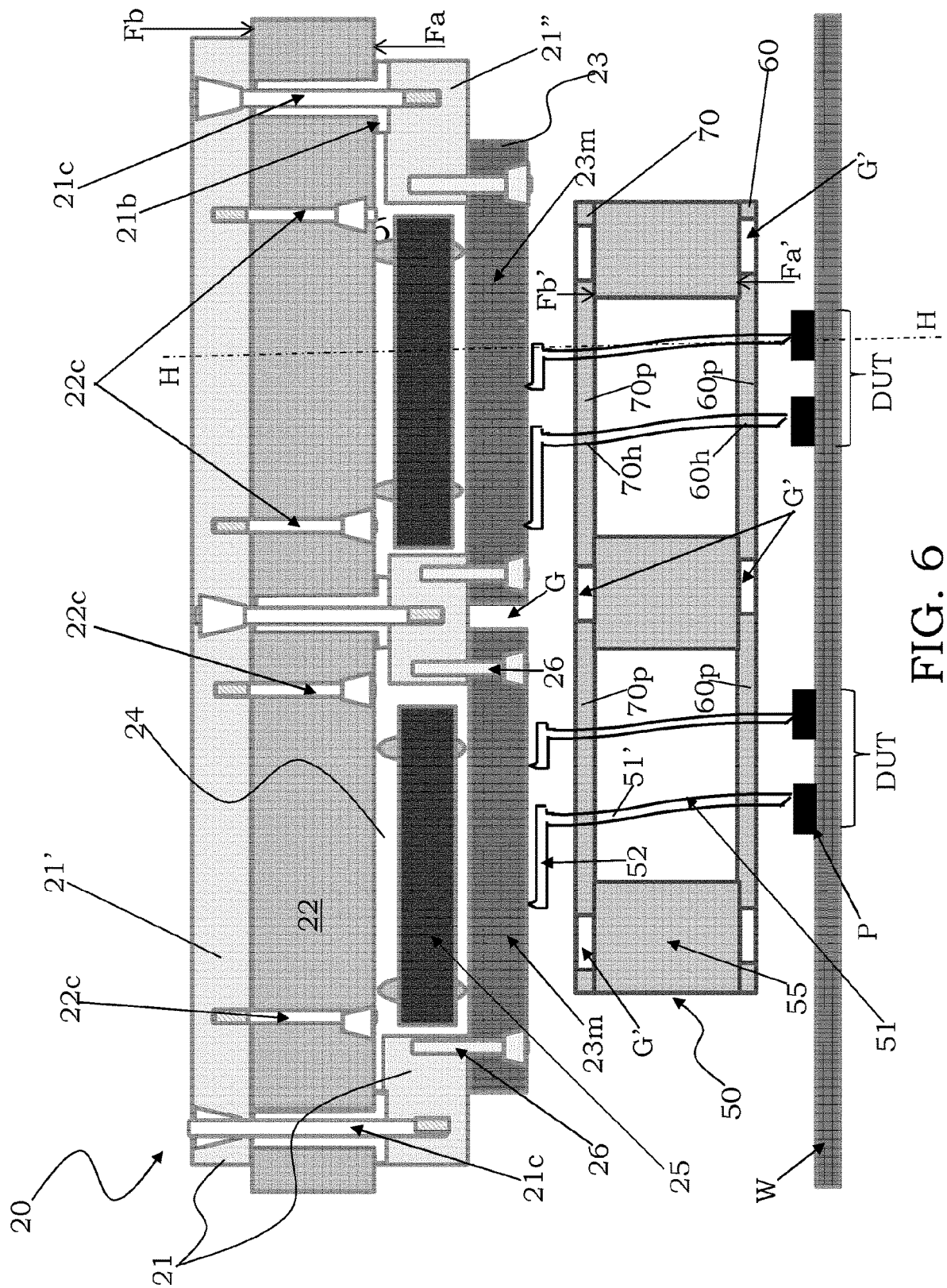
FIG. 6 schematically shows a probe card including the probe head according to the present invention.

In an embodiment of the present invention illustrated in FIG. 6, the second end 51*b* of the contact elements 51 is structured so that it comprises an arm 52 laterally projecting from the probe body 51' and configured to carry out the contact for example with an interposer of a probe card, said arm 52 being adapted to decentralize the contact point with respect to the longitudinal axis H-H of the contact probes 51.

In other words, in this embodiment, the contact elements 51 of the probe head 50 have contact heads provided with arms projecting from the probe body and adapted to contact for example an interposer of a probe card, said arms extending in length in a different manner from probe to probe so as to allow an efficient spatial redistribution of the contact pads of the probe card with respect to the pads of the devices under test DUT, in particular a loosening of the constraints of the pitch of said devices under test. The respective longitudinal lengths or extensions of the arms can be selected based on the needs in order to obtain the best redistribution of the contact pads, and thus the best routing of the signals, and configurations are provided in which not all the probes comprise projecting arms. For the sake of clarity, it is observed that the length of the arms 52 is measured along the longitudinal development direction thereof (for example orthogonal to the axis H-H of the probes).

In an embodiment, in order to ensure the correct holding of the contact elements 51, their portion housed in the upper guide holes 70*h* is provided with a suitable holding system (not illustrated in the figures, for instance a spring or clip structure, or a structure in which an appropriate surface corrugation/irregularity allows a better retention in the guide holes). This configuration adopted for the contact elements 51 allows not to perform a shift between the lower and upper guides during the assembly, said shift being done for deforming the probe body to favor deflection and hold the probes, which instead are held as above illustrated. Only a small (almost imperceptible) pre-deformation of the probe body 51' is sufficient to ensure that, during the test, all probes bend in a same direction. The fact that the guides (or rather their corresponding guide holes) are not shifted with respect to each other allows dividing into a plurality of guide portions 70*p* even the upper guide 70 and not only the lower guide 60, with even better thermal shift control. In other words, the above holding system allows not to perform the shift of the guides for holding the probes, so as to easily cut also the upper guide 70, thus obtaining a greater flexibility in the control of the thermal shifts. Obviously, the presence of the above-mentioned holding system is independent from the specific shape of the contact element 51, which may have any suitable structure.

Accordingly, in light of the above, it is preferable that both the lower guide 60 and the upper guide 70 are divided into the plurality of guide portions 60*p* and 70*p*.

Finally, still referring to FIG. 6, in an embodiment, the probe head 50 is connected to the rest of a probe card, indicated with the reference 20, which allows the actual connection with the testing apparatus (not illustrated in the figures).

The probe head 50 is fastened to the rest of the probe card 20, in particular to a stiffener, for example by screws, even if other suitable connection modes are possible.

As mentioned above, the probe card 20 comprises a stiffener 21 in turn including a first stiffener portion 21' and a second stiffener portion 21,".

In particular, the first stiffener portion 21' and the second stiffener portion 21" are initially structurally independent from each other, i.e., the stiffener 21 is substantially structured as two separated stiffeners. The first stiffener portion 21' is also called upper stiffener and the second stiffener portion 21" is also called lower stiffener. The first stiffener portion 21', during the test, is closer to the testing apparatus, while the second stiffener portion 21", during the test, is closer to the wafer W including the devices under test DUT.

Furthermore, the probe card 20 comprises an interface board or support plate 22 configured for interfacing said probe card 20 to the testing apparatus. More in particular, the interface board 22 is a printed circuit board (also indicated as PCB).

The interface board 22 comprises at least one lower face Fa which, during the test, faces towards the wafer W including the devices under test DUT, and an upper face Fb opposite the lower face Fa.

As illustrated in FIG. 6, the interface board 22 is arranged between the first stiffener portion 21' and the second stiffener portion 21", substantially forming a sandwich configuration.

For example, the interface board 22 has a thermal expansion coefficient of about 16. In order to limit the effects of the thermal expansion of the interface board 22 during the test, in an embodiment, said interface board 22 is associated to the stiffener 21 in a floating manner.

More in particular, connection elements with clearance 22c are provided for connecting the interface board 22 to the stiffener 21 (in particular to the first stiffener portion 21'), said connection elements with clearance 22c (such as for example suitable screws) being floatingly housed in a plurality of respective seats 22s (such as for example suitable slotted holes) formed in said interface board 22, so as to allow said interface board 22 to be associated to the stiffener 21 in a floating manner.

Also the connection between the first stiffener portion 21' and the second stiffener portion 21" should be such as to allow the relative movement of the interface board 22 arranged between them, at least in the plane x-y (i.e. the plane in which the wafer W lays, and possibly slightly also along the vertical axis z), i.e., to avoid to fixedly fasten said interface board 22.

The first stiffener portion 21' and the second stiffener portion 21" are secured to each other by a plurality of screws 21c. Bushes 21b can be furthermore provided for facilitating the above-mentioned floating of the interface board 22. Obviously, also many other connection modes can be provided, the figures being provided only by way of an indicative and non-limiting example of the scope of the present invention.

In an embodiment, the first stiffener portion 21' and the second stiffener portion 21" are then rigidly connected to each other, for example by screws as illustrated above.

In an embodiment of the present invention, the stiffener 21 is made of a material selected among suitable alloys FeNi (for example Invar, Kovar, Alloy 42 and others), titanium and alloys thereof, aluminium or alloys thereof, steel, brass, Macor, without being however limited to these materials. In general, as already observed for the containment element 55, the CTE of the stiffeners 21' and 21" is optimized (and thus the proper material thereof is selected) according to the temperature range at which the probe card 20 operates, which can be controlled thanks to the used materials.

In an embodiment of the present invention, the first stiffener portion 21' and the second stiffener portion 21" are respectively made in materials having different CTEs, in which during the test a temperature gradient is created and the first stiffener portion 21' (which is further away from the device under test) preferably has a CTE higher than the second stiffener portion 21". The balance between said stiffener portions is performed, as above-mentioned, according to the testing platform and to the operating temperature range. Obviously, it is possible to use a same material (for example only Kovar) for said components, but with a CTE controlled in a different manner so as to compensate the above-mentioned gradients, so as to use also different materials (for example selected between those which are above-mentioned).

Obviously, the provided examples are only indicative and not limiting the scope of the present invention, which is not limited by the used materials.

The probe card 20 further comprises an interposer 23 connected to the stiffener 21, in particular connected to the second stiffener portion 21".

As known in the field, the interposer 23 is adapted to provide a spatial transformation of the distances (pitches) between contact pads formed on opposite faces thereof, which is the reason why said component is also called "space transformer".

Analogously to what has been seen for the guides of the probe head 50, the interposer 23, when is connected to the second stiffener portion 21,", is in the form of a monobloc of material. In particular, the interposer 23 is connected to the stiffener 21 as a single component (for example a single board).

Once the interposer 23 is connected to the stiffener 21 (in particular connected to the lower face of the second stiffener portion 21" facing towards the devices under test DUT), it is successively cut according to a predetermined pattern, defining in this way a plurality of modules 23m independent and separated from each other. In particular, at the end of the cutting, the single modules 23m are separated from each other by suitable empty spaces or trenches G.

In other words, at the end of the manufacturing of the probe card 20, the interposer 23 comprises a plurality of modules 23m separated from each other, said modules 23m being obtained by cutting the monobloc of material which is initially connected to the stiffener 21 (in particular to the second stiffener portion 21").

This considerably eases the assembly and setting-up of the probe card 20, since it is no more necessary to align the single modules (which would be instead required if said modules were directly associated to the stiffener already singulated, as it happens in the prior art solutions). The structural independence of the modules then guarantees a higher control of the thermal expansion of the components during the test, in particular at extreme temperatures, analogously to what was previously observed for the probe head 50.

In general, there is no strict relationship between the partition of the guides of the probe head 50 previously described and the partition of the interposer 23, even if, in particular embodiments, it is not excluded the possibility to adopt a same pattern for the interposer and the guides.

In an alternative embodiment, it is also possible to use more than a monobloc of material (for example two or three, in any case in a limited number), said monoblocs being anyway always subsequently divided into many independent modules.

Summing up, the probe card 20 is made by a manufacturing method comprising at least the steps of:
- providing the stiffener 21 comprising the first stiffener portion 21' and the second stiffener portion 21";
- connecting the interposer 23 to the second stiffener portion 21", said interposer 23 being in the form of a monobloc of material;
- cutting the interposer 23 according to a predetermined pattern after connecting it to the second stiffener portion 21", thereby defining a plurality of modules 23m separated from each other (in this way, after cutting, the interposer 23 is structured and divided into the plurality of independent modules 23m, analogously to the guide portions 60p and 70p);
- providing the interface board 20;
- arranging the interface board 22 between the first stiffener portion 21' and the second stiffener portion 21";
- fastening to each other the first stiffener portion 21' and the second stiffener portion 21"; and
- associating the probe head 50 to the interposer 23.

Obviously, except the sequence which provides first the connection of the interposer 23 to the stiffener 21 and then the cutting, all the other steps are not necessarily following a determined fixed sequence. For example, as above illustrated, it is possible firstly to connect the interposer 23 to the second stiffener portion 21" and cut it, and then connect the second stiffener portion 21' to the first stiffener portion 21", even if other suitable sequences are not excluded.

It is observed that, herein, the term "associating" means connecting, both directly and indirectly, an element to another, not necessarily in a rigid manner.

Furthermore, in a preferred embodiment of the present invention, the cutting of the interposer 23 is performed by laser cutting. Alternatively, it is also possible to use a water cutting (Water Jet), or a combination of the two above-mentioned techniques. In any embodiment, the cutting of the interposer which determines the total separation between the modules (i.e. their relative independence), always takes place after the assembly thereof on the stiffener.

As above mentioned, the interposer 23 has the function to route the signals carried by the contact elements 51 and allows a redistribution of the contact pads on the PCB. In general, the space transformers are made of a MLC (Multi Layer Ceramic). Suitably, the interposer 23 is instead made of a Multi Layer Organic material (MLO). The use of a MLO guarantees a higher flexibility with respect to a ceramic material, as well as a higher ease of manufacturing (making for example easier the laser cutting, with consequent saving of manufacturing costs).

As illustrated in FIG. 6, the first end 51a of the contact elements 51 of the probe head 50 is adapted to contact the contact pads P of the devices under test DUT, while the second end 51b is adapted to contact the interposer 23 in a non-fixed manner. In this way, the contact elements are not fixedly fastened to the interposer 23. As previously seen, in a preferred embodiment, the contact elements 51 are suitably vertical contact probes, such that it is possible to take advantage of all the advantages of this vertical technology, in which the probe body bends during the contact with the devices under test.

According to an embodiment, the second stiffener portion 21" comprises a plurality of housing seats 24, and at each of said housing seats 24 a corresponding module of the plurality of modules 23m of the interposer 23 is arranged. The housing seats 24 can be through holes formed in the second stiffener portion 21" and are in a number identical to the one of the modules 23m of the interposer 23, which are arranged at respective housing seats 24. In other words, it is possible to preliminary define, in the second stiffener portion 21", the plurality of housing seats 24, such that corresponding modules of the plurality of modules 23m of the interposer 23 are cut at said housing seats 24.

In an embodiment, the probe card 20 comprises a plurality of electrical connection elements 25 housed in the housing seats 24 and configured to electrically connect the interposer 23 and the interface board 22 to each other. In this way, in the manufacturing process of the probe card 20, the electrical connection elements 25 are inserted in the respective housing seats 24 before connecting the interposer 23 to the second stiffener portion 21".

By way of example, the electrical connection elements 25 can be conductive elastomers, pogo pins or conductive clips.

Each module of the plurality of modules 23m is fastened to the second stiffener portion 21" by screws 26, preferably by two screws 26. For example, screws 26 can be provided at two opposite edges (or corners) of each module 23m.

Obviously, it is possible to use a different number of screws, as well as it is possible to adopt different ways to attach the interposer 23 to the second stiffener portion 21". For example, in an alternative embodiment, the interposer 23 can be glued to the second stiffener portion 21".

In any case, independently from the connection mode, the interposer 23 is always connected to the second stiffener portion 21" as a monobloc of material prior to the cutting thereof, analogously to what has been seen for the guides of the probe head 50. Therefore, the complete separation into modules is carried out after the fastening to the stiffener.

The interposer 23 may comprise a high number of modules 23m, for example a number of modules which varies from 50 to 150. Each module is configured to test a plurality of devices, for example a number of devices ranging from 1 to 30. Therefore, with a single testing operation, the probe card 20 of the present invention can carry out, thanks to the large size thereof and to the large number of modules 23m associated thereto, the test of a high number of devices, while being at the same time easy to assemble and guaranteeing an optimal control of the thermal expansion of the components thereof.

In conclusion, the present invention provides a probe head manufactured by a method according to which the guides are initially fastened to the housing in the form of a single plate (for example a single plate of ceramic material) and subsequently cut into a plurality of guide modules or guide portions which are independent and separated from each other. In this way, the guides are associated with the probe head as a single material block (monobloc of material), without having to carry out an alignment of the single guide portions, which then allow an improved control of the thermal expansion of the probe head during the test.

Advantageously according to the present invention, it is thus possible to control, in an extremely simple manner, the thermal expansion of the components of the probe head during the test at extreme temperatures, significantly reducing, if not completely eliminating, the harmful effects of such thermal expansion. The probe head of the present disclosure is thus able to withstand and bear remarkable temperature variations (for example from −40° C. to +125° C.) without undergoing warping or bending of the components thereof.

More in particular, thanks to the guide portions independent and separated from each other, said guides are not linked to the thermal expansion coefficient of the housing (i.e., they are not affected by the expansion of the latter), such that the expansion of said housing does not cause mechanical stresses of the guides thanks to the free spaces which are created between a module and the other one and which allow a respective displacement thereof.

The thermal expansion of the probe head as a whole is thus mainly due to the contribution of the housing, whose thermal expansion coefficient can be calibrated such that the assembly can expand without creating warping or bending, thus guaranteeing the planarity of the probe head over the whole range of test temperature (which, as previously observed, can vary between extreme values). In other words, the relative independence of the modules of the guides ensures that the global thermal expansion coefficient of the probe head is substantially linked only to the housing and managed by selecting the material thereof, such that it is simpler to compensate the temperature gradients and the different thermal expansions inside said probe head. Suitably, it is thus simple to manage the CTE of the housing in such a way that it is proportional to the one of the silicon wafer.

Suitably according to the present invention, this configuration is obtained in an extremely simple way, initially fastening (constraining) the guides to the housing, and then completely separating the various modules only after the connection. Advantageously, the adopted solution allows the various modules not to be aligned to each other, since they are already perfectly aligned once the guides are cut (which are initially in the shape of a single material piece), considerably simplifying the manufacturing and usage of the probe head of the present invention. All this causes a considerable saving in manufacturing times and costs, at the same time obtaining a much more reliable solution, since alignment errors between the various components are avoided.

This is particularly advantageous in the case of large probe heads, such as for example those used for testing memory devices such as DRAMs, for which the relative alignment of the various components is even more delicate due to the large sizes, and for which the thermal expansion of the various components is even more critical.

Suitably, thanks to the structure of the probe head of the present disclosure, it is furthermore possible to take advantage of all the advantages and potentialities of the vertical technology, since the adopted architecture is the one of a probe head with vertical probes (vertical probe head).

Finally, the combined use of said probe head with an interposer that is divided into various separated and independent modules allows obtaining an even finer and more efficient control of the thermal expansion during the test at extreme temperatures. In this case, it is in fact possible to have a control of the CTE both at the interposer level and at the probe head level, increasing the degree of thermal control of the probe card as a whole. In other words, by separating from each other the various guide portions as above illustrated, it is possible to control the thermal expansion of the head part by only controlling the expansion of the housing (whose material ensures a better control with respect to the ceramic material of the guides), and thus obtaining multiple degrees of freedom in the thermal control of the components of the probe card: it is thus easier to manage the tolerance to thermal shifts, which are distributed on multiple interfaces.

Obviously, a person skilled in the art, in order to meet contingent and specific requirements, may make to the method and to the probe head above described numerous modifications and variations, all included in the scope of protection of the invention as defined by the following claims.

The invention claimed is:

1. A method for manufacturing a probe head for the functionality testing of devices under test, comprising the steps of:
   providing a containment element;
   arranging a lower guide at a lower face of the containment element, the lower face facing towards the devices under test during the test; and
   arranging an upper guide at an upper face of the containment element, the upper face being opposite the lower face,
   wherein the containment element is interposed between the lower guide and the upper guide, and
   wherein the guides are in the shape of at least one single plate when they are connected to the containment element,
   the method further comprising the steps of:
   cutting at least one of the lower guide or the upper guide thereby defining a plurality of guide portions which are independent and separated from each other, starting from said at least one single plate; and
   inserting contact elements into guide holes formed in the guides, the contact elements being adapted to contact pads of the devices under test, and
   wherein the method further comprises a sequence in which first the connection of the guides, which are in the form of a single plate, to the containment element is performed, and then the cutting of at least one of the guides into separated guide portions is performed.

2. The method according to claim 1, wherein both the lower guide and the upper guide are divided into the plurality of guide portions.

3. The method according to claim 1, wherein the cutting of the single plate of the guides is performed by laser cutting or water cutting.

4. The method according to claim 1, further comprising the preliminary step of gluing the lower guide and the upper guide to the containment element prior to the cutting thereof.

5. The method according to claim 1, further comprising the step of forming, prior to cutting the guides, the guide holes for housing the contact elements.

6. The method according to claim 1, further comprising the step of forming in the containment element a plurality of housing seats which are separated from each other by internal arms, thereby defining a mesh structure adapted to support the guides, the contact elements being housed in the housing seats.

7. The method according to claim 1, wherein the single plate of the guides is made of a ceramic material.

8. The method according to claim 1, further comprising the step of selecting the material of the containment element among Invar, Kovar, Alloy 42 or FeNi alloys, Titanium or alloys thereof, Aluminium or alloys thereof, Steel, Brass, Macor.

9. The method according to claim 1, further comprising the step of associating the probe head with a probe card which comprises a stiffener, an interposer, and an interface board.

10. The method according to claim 9, wherein the probe card is manufactured through the steps of:
    connecting the interposer to the stiffener, the interposer being in the shape of at least one monobloc of material; and
    cutting the at least one monobloc of the interposer according to a predetermined pattern after connecting it to the stiffener, thereby defining a plurality of modules separated from each other.

11. A probe card for the functionality testing of devices under test, comprising:
a stiffener;
an interface board associated with the stiffener and configured to interface the probe card to a testing apparatus; and
a probe head comprising:
a containment element;
a lower guide arranged at a lower face of the containment element, the lower face facing towards the devices under test during the test;
an upper guide arranged at an upper face of the containment element, the upper face being opposite the lower face; and
a plurality of contact elements housed in guide holes formed in the guides, the contact elements being adapted to contact pads of the devices under test,
wherein the containment element is interposed between the lower guide and the upper guide,
wherein at least one of the guides is divided into a plurality of guide portions which are independent and separated from each other,
wherein the guide portions is obtained by cutting at least one single plate that is initially connected to the containment element, and
wherein the interface board comprises a plurality of modules that are independent and separated from each other, and wherein the modules of the interface board are obtained by cutting at least one monobloc of material that is initially connected to the stiffener.

12. The probe according to claim 11, wherein the contact elements are vertical contact probes comprising a body which extends along a longitudinal axis between a first end and a second and opposite end, the first end being adapted to contact the pads of the devices under test.

13. The probe card according to claim 11, wherein the guides comprise a number of guide portions ranging from 4 to 100.

14. The probe card according to claim 11, wherein the containment element is made of at least one of Invar, Kovar, Alloy 42 or FeNi alloys, Titanium or alloys thereof, Aluminium or alloys thereof, Steel, Brass, Macor.

15. The probe card according to claim 11, wherein the guides are made of a ceramic material.

16. The probe card according to claim 11, wherein the containment element comprises a plurality of housing seats which are defined by internal arms, the internal arms being configured to support the guide portions.

* * * * *